S. P. LONG.
RESILIENT TIRE.
APPLICATION FILED APR. 8, 1922.

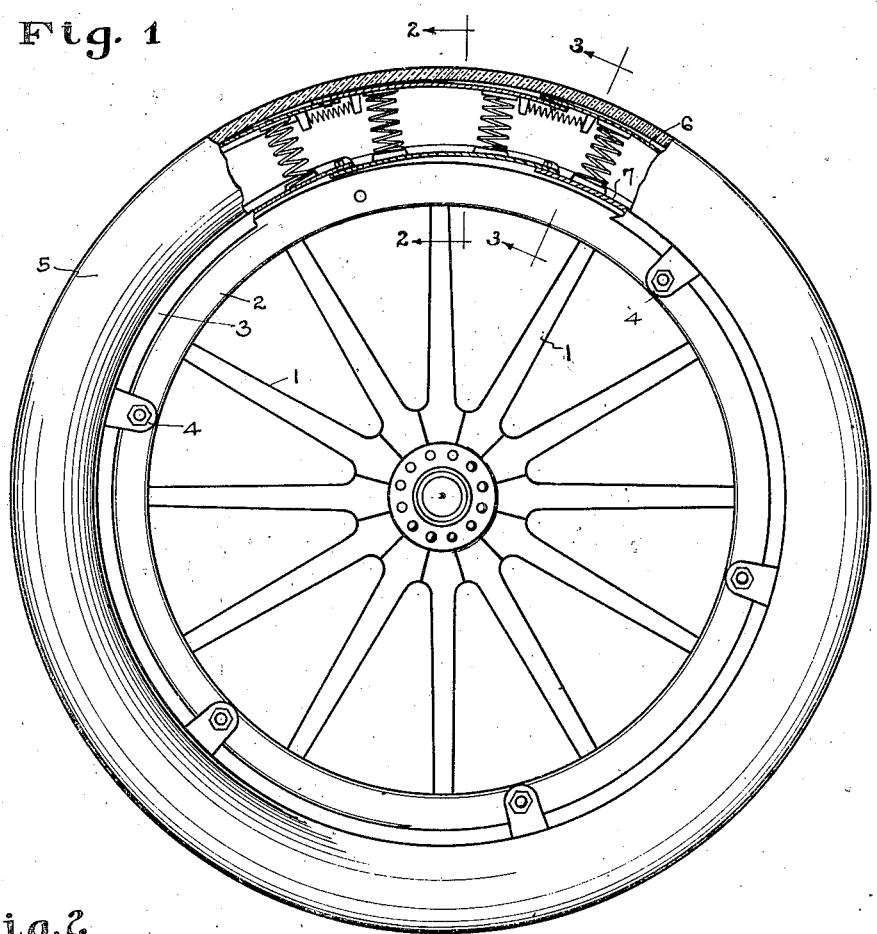
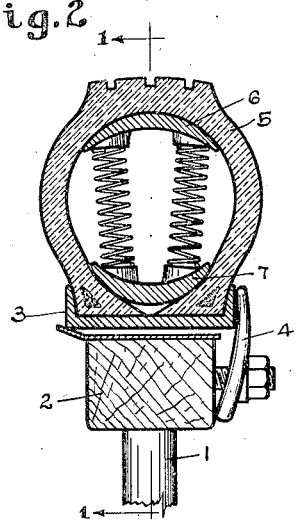
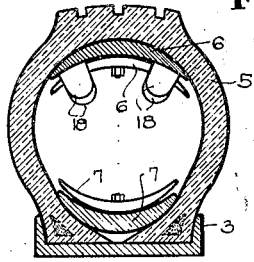

1,422,996.

Patented July 18, 1922.
2 SHEETS—SHEET 2.

Inventor
S. P. Long.

By
Attorney

UNITED STATES PATENT OFFICE.

STEVENS P. LONG, OF BIRMINGHAM, ALABAMA.

RESILIENT TIRE.

1,422,996.  Specification of Letters Patent.  Patented July 18, 1922.

Application filed April 8, 1922. Serial No. 550,905.

*To all whom it may concern:*

Be it known that I, STEVENS P. LONG, a citizen of the United States of America, residing at Birmingham, in the county of Jefferson and State of Alabama, have invented certain new and useful Improvements in Resilient Tires, of which the following is a specification.

My invention relates to an improvement in resilient tires and contemplates the provision of a sectional spring filler adapted to be inserted in a tire casing such as is now used in connection with pneumatic inner tubes, my object being to supplant the use of such perishable and puncturable inner tubes by the provision of a sectional spring annulus which will operate without damage or injury to the casing and yet form a satisfactory resilient tire.

More particularly my invention comprises a novel means for the construction of the individual sections of the spring annulus and of the means for adjustably connecting the sections together and for mounting the springs in the sections.

A further distinctive feature of my invention consists in the provision of circumferentially disposed springs working between abutments on the ends of adjacent sections of the spring annulus, thus holding the annulus expanded while permitting it to contract in circumference to the limited extent necessary to care for its compression under load.

My invention further comprises the novel details of construction and arrangements of parts, which in their preferred embodiment only are illustrated in the accompanying drawings, in which:—

Fig. 1 is a side elevation of a wheel partly broken away along the section line 1—1 of Fig. 2.

Figs. 2 and 3 are transverse cross-sections taken on the lines 2—2 and 3—3 of Fig. 1.

Similar reference numerals refer to similar parts throughout the drawings.

Figure 4:
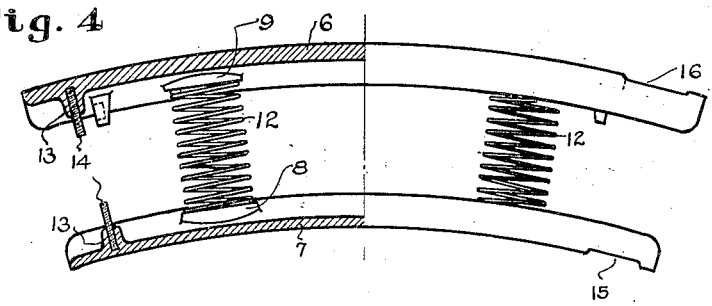
Fig. 4 is a side elevation partially in cross section.
Figure 5:
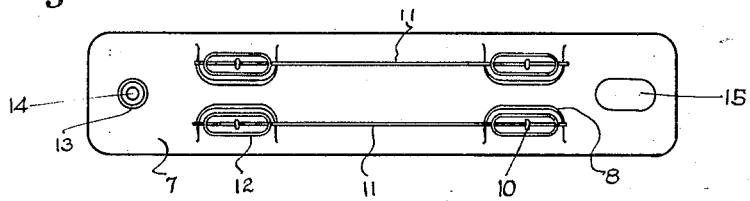
Fig. 5 is a plan view of the inner plate with the springs mounted thereon.
Figure 6:
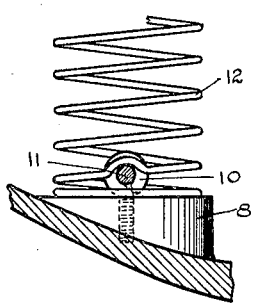
Fig. 6 is a detail of one of the vertical springs showing means of anchorage.

I have shown my invention as applied to a wheel which is of the conventional automobile type comprising spokes 1, a felly 2, and a demountable rim 3 held in place by rim clamps 4. Mounted on the rim 3 is a pneumatic tire casing 5 which may be of any standard type. Within this casing 5 is mounted my spring annulus or resilient core to replace the customary pneumatic inner tube. This core, when completely assembled, forms an annulus and is made up of a plurality of sections which are all similar so that a description of one section will apply to all. A section is best illustrated in Figs. 4 and 5, wherein I show it formed by two curved metal plates 6 and 7, both struck on an arc from the wheel center and each being curved both in a circumferential plane of the wheel and also in a transverse radial plane through the wheel, the curvature corresponding substantially to the inside curvature of the casing. The two plates present their concave faces towards each other considered transversely. The inner plate 7 is provided with a series of spring seats or bosses 8 arranged in pairs on each side and the outer plate 6 is provided with similar seats or bosses 9 likewise arranged in opposite pairs. In each of these bosses I mount, as shown in Fig. 6, a screw eye 10 which is set to receive a spring securing wire or rod 11. This rod is inserted lengthwise between the end coils of a spring 12 resting on its respective seat and each rod, as indicated in Fig. 5, passes through and serves to secure in place the two springs on the same side of its respective section. These springs are preferably of the oval shape, as shown in Fig. 5, and at their outer ends are likewise secured by outer tie rods 11 to the outer spring seats 9. In this manner the inner and outer plates are yieldingly connected by means of the springs. At the left hand end of each plate 6 and 7 of a section on their inside faces I form a boss 13 which has a threaded socket to receive a screw stud 14. These screw studs are adapted to be inserted through an elongated slot 15 in the plate 7 and 16 in the plate 6, and each to receive a nut 17 by means of which two sections are joined at their ends free for a limited play, the slots 15 and 16 being circumferentially elongated as indicated in Fig. 5.

Figure 7:
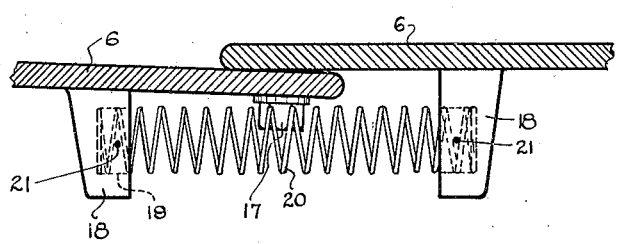
Fig. 7 is a detail of one of the circumferentially disposed springs.

On each side adjacent to the end of each plate 6 and 7 I form a lug 18, and each lug is provided with a countersunk spring seat 19 facing toward the adjacent end of its respective plate. These lugs, as shown in Fig. 7, are disposed in opposite pairs and receive a coiled compression spring 20 between them which is locked in each seat by the cross pins or keys 21. It is contemplated that the lapped ends of the plates of adjacent spring sections shall be thus yieldingly held in expanded position, that is to say, with the stud bolts 14 at the outer end of their respective slots 15 and 16. This enables the sections to collapse together slightly under the load, the sections moving against the tension of the interposed pairs of springs 20. As will be noted in Fig. 3, these spring lugs 18 are arranged in opposite pairs on each side of a circumferential central plane through the wheel and thus avoid any tendency of the sections to cock to either side but hold them free for their limited play in a circumferential plane.

In operation, having assembled the spring annulus within the tire casing, the latter is mounted on the wheel in the customary manner and in service the spring sections successively take the load, being free to have sufficient play relative to the adjacent sections so that each in turn comes under compression and takes the load on the wheel without binding on the adjacent sections or unduly rubbing or damaging the casing.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. A resilient filler for tire casings, comprising a sectional annulus, each section comprising inner and outer curved plates provided with spring seats, springs mounted on said seats, means connecting the sections and adapted to permit the contraction of the annulus, and resilient means to oppose the contraction of the annulus.

2. A resilient filler for tire casings, comprising a sectional annulus, each section comprising inner and outer spring seats, springs mounted on said seats, means connecting the sections and adapted to permit the contraction of the annulus, and resilient means to oppose the contraction of the annulus, said resilient means comprising compression springs interposed between the annulus sections.

3. A resilient filler for tire casings, comprising a sectional annulus, each section comprising inner and outer spring seats, springs mounted on said seats, means connecting the sections and adapted to permit the contraction of the annulus, and resilient means to oppose the contraction of the annulus, said resilient means comprising coiled compression springs interposed between lugs at the ends of adjacent annulus sections and disposed in pairs at each joint with a member of each pair disposed on each side of a circumferential central plane through the annulus and tire casing.

4. A resilient filler for tire casings, comprising a series of spring sections flexibly and yieldingly connected, each section comprising arcuate inner and outer plates which are transversely curved to conform to the inner contour of a tire casing, compression springs serving to connect said plates near each end of a section, spring abutment lugs at the ends of the outer plate, coil springs mounted in these abutments and adapted to engage opposed abutments of adjacent sections, and circumferentially yieldable joint means connecting said sections.

In testimony whereof I affix my signature.

STEVENS P. LONG.

Witness:
NOMIE WELSH.